April 10, 1962 W. D. DRUKKER 3,028,886

LEAD STRAIGHTENING DEVICE

Filed Oct. 1, 1957 2 Sheets-Sheet 1

INVENTOR
W. D. DRUKKER
BY C. B. Hamilton
ATTORNEY

April 10, 1962 W. D. DRUKKER 3,028,886

LEAD STRAIGHTENING DEVICE

Filed Oct. 1, 1957 2 Sheets-Sheet 2

INVENTOR
W. D. DRUKKER
BY C. B. Hamilton
ATTORNEY 3,028,886
LEAD STRAIGHTENING DEVICE Willard D. Drukker, Downers Grove, Ill., assignor to Western Electric Company, Incorporated, New York, N.Y., a corporation of New York Filed Oct. 1, 1957, Ser. No. 687,552
10 Claims. (Cl. 140—147)

This invention relates to a wire straightening mechanism, or more specifically to a device for straightening the wire leads of electrical components.

The present methods of straightening electrical component leads or wires usually consist of placing the leads on plane surfaces and rolling the leads along the surface by means of a movable upper surface. In many instances, however, when the leads are bent into certain configurations, the moving surface merely slides the leads along the stationary surface in lieu of the desired rolling action and therefore fails to achieve the desired results. Also, it often occurs that the mere rolling of the wire leads does not sufficiently alter the stresses of the bent leads to completely straighten the wire.

It is therefore the object of this invention to overcome these disadvantages by providing an automatic wire straightening device which will straighten deformed wire by producing equalizing stresses on the wire.

Another object of the invention is to provide wire forming anvils having irregular forming surfaces which produce slight depressions and rises in the component lead which overcome the bending stresses within the lead and produces an essentially straight lead.

Another object of the invention is to provide a feeding mechanism which positions an electrical component between a pair of forming anvils such that the bent leads are prevented from becoming entangled within the anvil structure.

A still further object of the invention is to provide an air suspension system which will position an electrical component between a pair of straightening jaws to permit the jaws to close around the suspended component leads, thereby preventing the leads from becoming entangled between the forming surfaces of the jaws.

With these and other objects in view, the present invention contemplates a straightening device comprising an upper jaw and a lower jaw having longitudinal grooves along the lengths of the jaws. A pair of V-shaped wire straightening anvils are mounted adjustably within each groove to provide spacing between the pairs of anvils for various sized component bodies. Slots are cut across the anvils in such a manner as to construct alternately spaced V-shaped projections along the length of the anvils. The projecting portions of the anvils mounted in the upper jaw are offset in relation to those of the lower jaw such that the projecting portions of the upper anvils are adapted to mesh with those of the lower. A pair of guides or tracks approach the jaws diagonally and support a component body on either side thereof to position wire leads extending laterally from a component between the open jaws. The component is suspended on the tracks and between the jaws by means of a jet or stream of air directed towards the component. By suspending the component in this manner, the wire leads are prevented from becoming entangled between the projecting portions of the anvils. Upon the closure of the jaws, the component is confined between the V-shaped anvil projections and upon the completion of the closing stroke, the component leads are straightened and the stresses equalized therein by irregular surfaces extending longitudinally along the anvils. Upon the opening of the jaws, another air jet or stream removes the component from the jaws as another is fed therebetween.

Other objects and advantages of the invention will become apparent upon consideration of the following description in conjunction with the accompanying drawings wherein.

Figure 1:
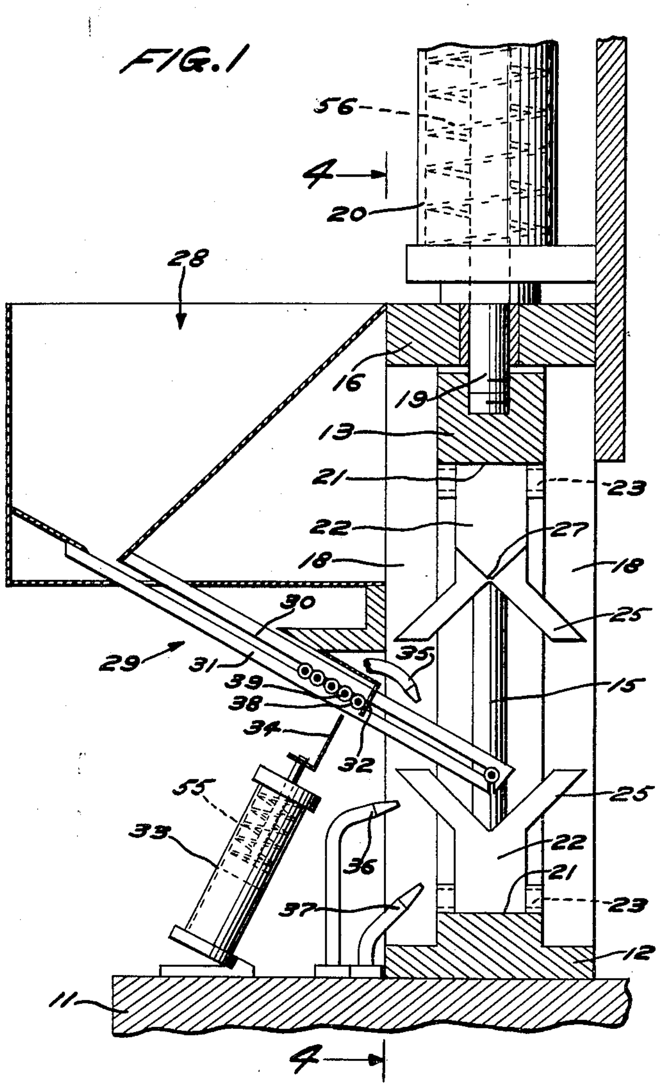
FIG. 1 is a side elevational view, in full section, illustrating a wire straightening mechanism embodying the features of the present invention.
Figure 4:
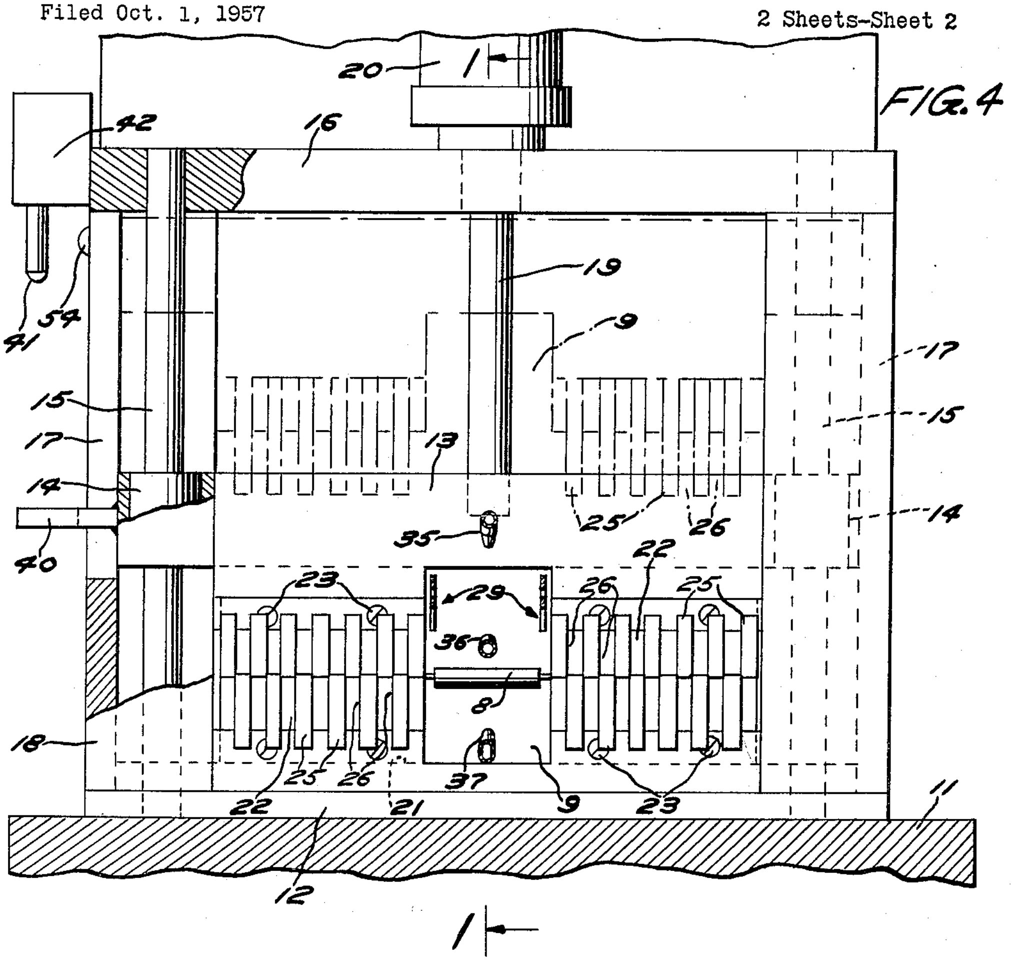
FIG. 4 is a front, elevation view, partially in section, illustrating the straightening jaws in a closed position.

Attention is now directed to FIGS. 1 and 4 wherein a base 11 is shown to support a stationary jaw 12. A movable jaw 13 is slidably mounted by means of bearings 14 upon vertical rods 15 which are secured to a cross bar 16 supported by upright members 17 and 18 extending from the base 11. A rod 19 driven by an air cylinder 20 extends through the cross bar 16 to open and close the movable jaw 13.

Figure 2:
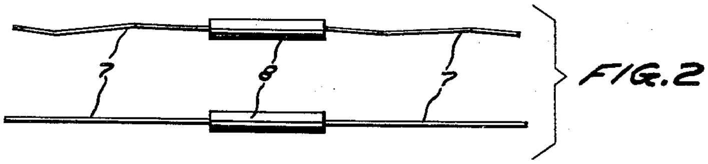
FIG. 2 illustrates a typical electrical component before and after a straightening operation by the mechanism shown in FIG. 1.

The jaws 12 and 13 are provided with central recessed portions 9 and contain longitudinal grooves 21 extending from the central recessed portions to the ends of the jaws. Within the grooves 21 are positioned forming anvils 22 which are adjustably mounted in any desired manner, such as by screws 23, so that the central opening between the anvils may be adjusted to compensate for various sized electrical component bodies 8 having leads 7 attached thereto to be straightened such as illustrated in FIG. 2.

Figure 5:
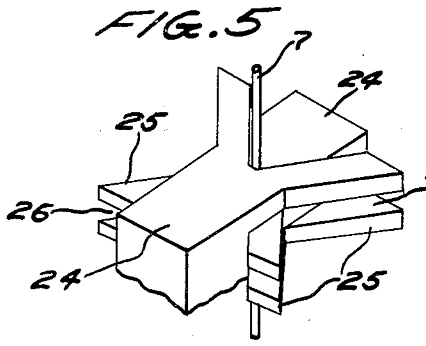
FIG. 5 is an enlarged perspective view of forming anvils of the straightening mechanism in a closed position.
Figure 6:
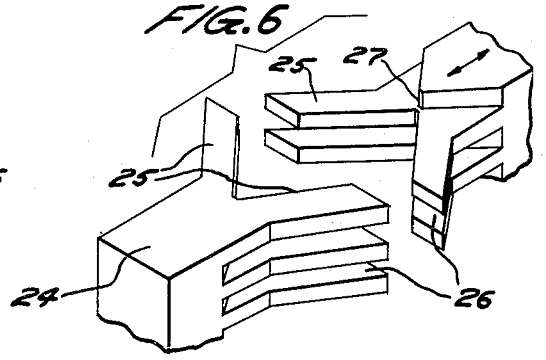
FIG. 6 is a perspective view of the anvils shown in FIG. 5 in an open position.

The forming anvils 22 (FIGS. 5 and 6) each consists of a base portion 24 and two series of outwardly projecting portions 25 which extend diagonally to form a V-shaped trough. Slots 26 are cut across the forming anvils 22 at regularly spaced intervals, thereby producing a plurality of V-shaped projections along the anvils. The slots 26 in the anvils mounted in the upper or movable jaw 13 are offset in relation to the slots formed in the anvils mounted in the lower jaw 12 such that the V-shaped projecting portions of the anvils in the upper jaw 13 are received by the slots in the anvils mounted in the lower jaw 12 and thereby the projecting portions of the anvils mesh as shown in FIG. 5 when the jaws are closed.

The slots 26 are cut in the anvils 22 to produce surfaces 27 the approximate width of a wire lead extending from an electrical component constructed to mate in the trough formed by the V-shaped projecting portions of the anvils. An irregular or a crenelated surface is formed at the bottom of the trough extending along the anvil by the surface 27 being on a slightly lower plane than the vertices of the V-shaped projecting portions of the anvil. The difference in depth between the peaks of the sharpened surfaces formed by the slots 27 and the surfaces presented by the vertices of the V-shaped projecting portions is very slight and may be approximately .003 inch. These crenelated surfaces straighten a wire lead upon closure of the jaws and are sufficiently shallow to produce a substantially straight wire lead. However, the shallow crenelated surfaces form slight depressions and rises in the component wire lead as shown exaggerated in FIG. 3. These depressions are sufficient to equalize or relieve the bending stresses within the leads.

A hopper 28 is attached to the frame and has a pair of downwardly extending guides or tracks 29 projecting from an opening in the bottom of the hopper 28. The guides consist of an upper member 30 and a lower member 31 which support the wire leads 7 on either side of the body portion 8 of an electrical component of the type shown in FIG. 2. The guides extend from the hopper to the central recessed portion 9 of the jaws 12 and 13 between the forming anvils 22 and the end portion of the guides extend downwardly between the jaws, permitting the leads 7 to be placed between the anvils 22. A blocking member 32, for example, a resilient spring, prevents the components from being fed between the jaws 12 and 13. An air cylinder 33 is mounted on the base 11 and is provided with a plunger 34. The cylinder 33 is actuated upon the opening of the jaws and the plunger 34 is moved between first and second components 38 and 39 resting against the resilient spring 32. The plunger 34 moves a sufficient distance to engage and remove the resilient spring 32 from the path of the guides 29, thereby allowing the component 38 to move down the tracks toward the open jaws 12 and 13. The component 39 and those stacked behind it are prevented from being fed between the jaws by the plunger 34. As the plunger is removed, the resilient spring 32 again moves into the path of the guides 29 and prevents the feeding of another component until the air cylinder 33 is again actuated.

An air nozzle 35 fastened to a suitable support is so positioned that a stream or jet of air is projected along the guides or tracks 29 to accelerate and insure a positive feed of the component to the straightening mechanism. As the component reaches the downwardly extending portion of the tracks 29, a stream or jet of air from an air nozzle 36 mounted on the base 11 forces the component against the bend in the guides 29 and prevents the component from falling into the V-shaped troughs of the forming anvils 22 in the lower jaw 12. The suspension of the component in this position prevents the bent leads from becoming entangled within the slots 26 and the outwardly projecting portions 25 of the anvils. The component remains suspended until the outwardly projecting portions of the upper anvils begin to mesh with the outwardly projecting portions of the lower anvil whereafter the upper anvils engage the wire leads to move the entire electrical component toward the lower jaw.

Another air nozzle 37, mounted on the base 11, directs its stream of air along the same direction as the outwardly projecting portions 25 of the forming anvils mounted in the lower jaw 12, thereby causing the component to be immediately ejected upon the opening of the jaws 12 and 13. The air nozzles 35, 36 and 37 and the air cylinders may be attached to any suitable support and may be operated by a control circuit such as shown in FIG. 7.

Figure 7:
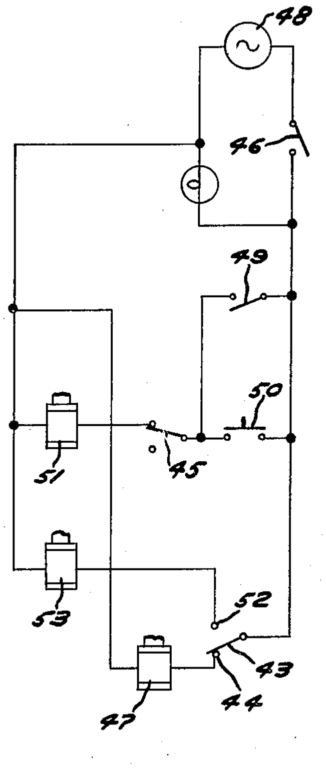
FIG. 7 discloses a circuit for controlling the straightening mechanism.

The operation of the straightening mechanism may be seen from FIGS. 1, 4 and 7. Assuming the movable jaw 13 to be in the upward position, a lever 40 secured to the jaw 13 will retain a plunger 41 within a housing 42 containing a dash pot type of time delay device which is mounted on the cross bar 16. The lever 40 also depresses a microswitch roller 54. The retraction of the plunger 41 into the housing 42 operates a microswitch 45, after a certain time delay, to the closed position shown in FIG. 7 and the depression of the microswitch roller 54 operates a microswitch 43 to engage a contact 44. Upon the closure of a power switch 46, current is fed from a suitable source of supply 48 through the switch 43 to a feed solenoid 47. The feed solenoid 47 operates a valve (not shown) for the air cylinder 33 and air nozzles 35 and 36 to start the electrical component feeding operation. The actuation of the air cylinder 33 moves the plunger 34 upwardly between components 38 and 39 moving the resilient spring 32 from the path of the guides 29, thereby allowing the component 38 to ride down the tracks 29 due to gravity and the air stream from nozzle 35. The component is suspended in the downwardly extending portion of the tracks 29 by the stream of air from nozzle 36 and is held in that position until the forming anvils 22 of the upper jaw 13 engage and move the wire leads of the component.

The downward stroke of the jaw 13 commences upon the closure of an automatic switch 49 or a manual switch 50 which completes a circuit to a jaw solenoid 51 through the microswitch 45. The actuation of the jaw solenoid 51 operates an air valve (not shown) to the air cylinder 20, thereby forcing the rod 19 and the jaw 13 downwardly. Upon the downward motion of the jaw 13, both the plunger 41 and the contact roller 45 are released, opening microswitch 45 and moving the microswitch 43 so that it engages contact 52. The opening of the microswitch 45 breaks the circuit of the jaw solenoid 51 before the downward stroke of the jaw 13 has been completed. The initial force given to the jaw 13 through the air cylinder 20 is sufficient, however, to carry the jaw 13 to the completion of its downward stroke. Breaking the feed solenoid circuit by means of switch 43, releases the valve for the air cylinder 33 and air nozzles 35 and 36 causes the plunger 34 to retract to its original position under the force of a return spring 55 within the air cylinder 33. The closure of the switch 43 with a contact 52 completes a circuit for the air ejection solenoid 53 which operates an air valve (not shown) for air nozzle 37 which projects an air stream along the direction of one of the outwardly projecting portions 25 of the anvil 22.

Figure 3:
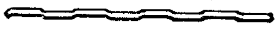
FIG. 3 illustrates an enlarged section of lead wire after the straightening operation, disclosing in an exaggerated form the depressions and rises formed in the lead for equalizing the stresses.

Upon the completion of the downward stroke of the jaw 13, the pressure exerted by the anvils straightens the component leads by causing slight crenelations in the leads thereby equalizing or relieving the bending stresses therein, as shown in an exaggerated view in FIG. 3. The jaw 13 is returned to the open position by means of a return spring 56 within the air cylinder 20 and the component operated upon is ejected upon the separation of the outwardly projecting portions 25 of the anvils in the upper and lower jaws. As the jaw 13 moves upwardly, the plunger 41 and switch roller 54 are again depressed. The depression of the contact roller 54 moves the microswitch 43 into engagement with the contact 44, thereby closing the circuit for the feed solenoid 47 causing the component feeding cycle to repeat and breaks the circuit to the air ejection solenoid 53 that shuts off the valve for air nozzle 37. The time delay provided by the dash pot mechanism within the housing 42 insured completion of the feeding of a component between the jaws before the commencing of the downward stroke of the jaw 13. If the automatic switch 49 were closed at the beginning of the cycle, the cycle will automatically repeat itself at the end of the time delay required to close the microswitch 45. If the manual switch 50 had been closed to start the initial cycle, the switch must again be operated every time it is desired to repeat the operating cycle.

It is to be understood that the above-described operation, arrangements of apparatus and construction of the elemental parts are simply illustrative of the application of the principles of this invention and many other modifications may be made thereto without departing from the scope and spirit of the invention.

What is claimed is:

1. A device for straightening wire leads of electrical component's comprising, a pair of opposed jaws, a pair of lead straightening members mounted in each jaw and spaced apart to receive an electrical component therebetween, spaced upper and lower guide members having end portions extending between said jaws of feeding an electrical component between said jaws, said upper guide member extending between said jaws beyond said lower guide member, a downwardly turned surface formed on said upper guide member horizontally beyond the end of said lower guide member, pneumatic means positioned so as to engage and force the component against said downwardly turned surface for suspending the component at a point spaced between said jaws, said lead straightening members including means for confining the component leads therebetween upon closure of said jaws, and means for opening and closing said jaws.

2. A device for straightening wire leads of electrical components comprising, a pair of opposed jaws, a pair of lead engaging V-shaped anvils mounted on each of said opposed jaws and spaced apart to receive an electrical component therebetween, said anvils each having slots cut therein to form a series of V-shaped projecting portions, said projecting portions of each of said anvils being receivable in the slots of the anvil opposite thereto whereby opposed anvils mesh upon closure of said jaws, spaced upper and lower guide members having end portions extending between said jaws for feeding an electrical component between said jaws, said upper guide member extending between said jaws beyond said lower guide member, a downwardly turned surface formed on said upper guide member beyond the end of said lower guide member, air jet means positioned opposite said downwardly turned surface to force the component against said surface for suspending the component at a point spaced between said jaws, and means for opening and closing said jaws.

3. A device especially adapted for feeding small cylindrical articles to be operated on by a pair of jaws comprising, upper and lower guide members having end portions adapted to extend between the jaws for feeding an article between the jaws when the jaws are in open position, said upper guide member extending between said jaws beyond said lower guide member, a downwardly turned surface formed on said upper guide member beyond the end of said lower guide member, and air jet means positioned opposite said downwardly turned surface to force the article against said surface to freely suspend the article between the jaws.

4. A device for feeding and ejecting electrical components to and from a wire straightening mechanism having a pair of jaws including two spaced forming anvils mounted in each jaw comprising, a hopper holding a plurality of electrical components having wire leads to be straightened, guide tracks including spaced apart upper and lower members extending from said hopper to the straightening mechanism, said guide track members having end portions extending between the jaws, said upper member extending between the jaws beyond said lower member, a downwardly turned surface formed on said upper guide member beyond the end of said lower guide member, means for feeding components one at a time along said guide tracks to the straightening mechanism between the jaws when the jaws are opened, air jet means positioned opposite said downwardly turned surface to force a component against said surface for suspending the component at a point spaced between the jaws whereby the component is gripped between the anvils upon closure of the jaws, and means for engaging and ejecting the component upon completion of a straightening operation when the jaws are opened.

5. A device for straightening wire leads of electrical components comprising, a pair of opposed jaws, a pair of lead engaging V-shaped anvils mounted on each of said opposed jaws and adjustably spaced apart to receive body portions of electrical components of varying sizes therebetween, said anvils each having slots cut therein to form a series of spaced V-shaped projecting anvil portions, said projecting portions of each of said anvils being receivable in the slots of the anvil opposite thereto whereby opposed anvils mesh upon closure of said jaws, a hopper holding a plurality of electrical components having wire leads to be straightened, a pair of guide tracks each having wire leads to be straightened, a pair of guide tracks each having upper and lower members spaced apart to receive the leads of the components therebetween extending from said hopper to said jaws with the end portions of said guide tracks positioned between said jaws, said guide track upper members extending between said jaws beyond said guide track lower members, downwardly turned surfaces formed on said upper members beyond the ends of said lower members, means for feeding components one at a time along said guide tracks, air jet means positioned opposite said downwardly turned surfaces to force a component against said surfaces for suspending the component at a point spaced between said jaws whereby the component is gripped between said anvils upon closure of said jaws, and means for engaging and ejecting the component upon completion of a straightening operation when said jaws are opened.

6. A device for bending wire to a desired configuration, which comprises a pair of opposed relatively movable V-shaped jaws, said jaws each having slots cut therein to form a series of spaced V-shaped projecting portions having vertices lying along a line substantially corresponding to the axis of a wire bent to the desired configuration, and to form a series of spaced wedge-shaped portions between said V-shaped projecting portions having apices substantially in alignment with said vertices, said V-shaped projecting portions of each jaw being receivable in the slots of the other jaw whereby said V-shaped projecting portions mesh upon closure of said jaws to confine a wire therebetween, first wire-engaging surfaces at the vertices of said V-shaped projecting portions, second wire-engaging surfaces at the apices of said wedge-shaped portions between said first wire-engaging surfaces, opposed ones of said first and second wire-engaging surfaces being substantially coextensive with respect to one another, the length of each of said first and second wire-engaging surfaces being greater than the diameter of the wire, said second wire-engaging surfaces at the apices of said wedge-shaped portions being displaced relative to laterally adjacent ones of said first wire-engaging surfaces at the vertices of said V-shaped projecting portions in the direction of relative movement of said jaws by an amount equal to a small fraction of the diameter of the wire, and said first wire-engaging surfaces at the vertices of said V-shaped projecting portions acting to bend respective portions of the wire against said second wire-engaging surfaces at the apices of said wedge-shaped portions upon closure of said jaws, whereby said first and second wire-engaging surfaces cooperate to equalize the stresses in the wire to form the wire to the desired configuration.

7. A device for bending wire to a desired configuration, which comprises a pair of opposed relatively movable V-shaped jaws, said jaws each having slots cut therein to form a series of spaced V-shaped projecting portions having vertices lying along a line substantially corresponding to the axis of a wire bent to the desired configuration, and to form a series of spaced wedge-shaped portions between said V-shaped projecting portions having apices substantially in alignment with said vertices, said V-shaped projecting portions of each jaw being receivable in the slots of the other jaw whereby said V-shaped projecting portions mesh upon closure of said jaws to confine a wire therebetween, first wire-engaging surfaces at the vertices of said V-shaped projecting portions, second wire-engaging surfaces at the apices of said wedge-shaped portions between said first wire-engaging surfaces, opposed ones of said first and second wire-engaging surfaces being substantially coextensive with respect to one another and substantially conforming to one another, the length of each of said first and second wire-engaging surfaces being greater than the diameter of the wire, said second wire-engaging surfaces at the apices of said wedge-shaped portions being displaced relative to laterally adjacent ones of said first wire-engaging surfaces at the vertices of said V-shaped projecting portions in the direction of relative movement of said jaws by an amount equal to a small fraction of the diameter of the wire, and said first wire-engaging surfaces at the vertices of said V-shaped projecting portions acting to bend respective portions of the wire against said second wire-engaging surfaces at the apices of said wedge-shaped portions upon closure of said jaws, whereby said first and second wire-engaging surfaces cooperate to equalize the stresses in the wire to form the wire to the desired configuration.

8. A device for straightening wire leads of an electrical component, which comprises a pair of opposed relatively movable jaws, a pair of V-shaped anvils secured to each of said opposed jaws and spaced apart to receive an electrical component therebetween, said anvils each having slots cut therein to form a series of spaced V-shaped projecting portions having vertices lying along a common straight line, and to form a series of spaced wedge-shaped portions between said V-shaped projecting portions having apices substantially in alignment with said vertices, said V-shaped projecting portions of each anvil being receivable in the slots of the anvil opposite thereto whereby said V-shaped projecting portions of opposed anvils mesh upon closure of said jaws to confine a wire lead between said anvils, first lead-engaging surfaces at the vertices of said V-shaped projecting portions, second lead-engaging surfaces at the apices of said wedge-shaped portions between said first lead-engaging surfaces, opposed ones of said first and second lead-engaging surfaces being substantially coextensive with respect to one another and substantially conforming to one another, the length of each of said first and second lead-engaging surfaces being greater than the diameter of the wire, said second lead-engaging surfaces at the apices of said wedge-shaped portions being displaced relative to laterally adjacent ones of said first lead-engaging surfaces at the vertices of said V-shaped projecting portions in the direction of relative movement of said jaws by an amount equal to a small fraction of the diameter of the wire, and said first lead-engaging surfaces at the vertices of said V-shaped projecting portions acting to bend respective portions of the leads against said second lead-engaging surfaces at the apices of said wedge-shaped portions upon closure of said jaws, whereby said first and second lead-engaging surfaces cooperate to equalize the stresses in the leads to straighten the leads.

9. A device for straightening wire leads of an electrical component, which comprises a pair of opposed relatively movable jaws, a pair of V-shaped anvils secured to each of said opposed jaws and spaced apart to receive an electrical component therebetween, said anvils each having slots cut therein to form a series of spaced V-shaped projecting portions having vertices lying along a common straight line, and to form a series of spaced wedge-shaped portions between said V-shaped projecting portions having apices substantially in alignment with said vertices, said V-shaped projecting portions of each anvil being receivable in the slots of the anvil opposite thereto whereby said V-shaped projecting portions of opposed anvils mesh upon closure of said jaws to confine a wire lead between said anvils, first lead-engaging surfaces at the vertices of said V-shaped projecting portions, second lead-engaging surfaces at the apices of said wedge-shaped portions between said first lead-engaging surfaces, opposed ones of said first and second lead-engaging surfaces being substantially coextensive with respect to one another and substantially conforming to one another, the length of each of said first and second lead-engaging surfaces being greater than the diameter of the wire, said second lead-engaging surfaces at the apices of said wedge-shaped portions being displaced relative to laterally adjacent ones of said first lead-engaging surfaces at the vertices of said V-shaped projecting portions in the direction of relative movement of said jaws by an amount equal to a small fraction of the diameter of the wire, and said first lead-engaging surfaces at the vertices of said V-shaped projecting portions acting to bend respective portions of the leads against said second lead-engaging surfaces at the apices of said wedge-shaped portions upon closure of said jaws, whereby said first and second lead-engaging surfaces cooperate to equalize the stresses in the leads to straighten the leads, means extending between said jaws for feeding the component between said jaws when said jaws are opened, means for engaging and suspending the component in said feeding means at a point spaced between said jaws, means positioned to engage and eject the component upon opening of said jaws, and means for opening and closing said jaws.

10. A device for straightening wire leads of an electrical component, which comprises opposed upper and lower jaws movable relative to one another into open and closed positions,, a pair of lead-engaging V-shaped anvils mounted on each of said opposed jaws and spaced apart to receive an electrical component therebetween, said anvils each having slots cut therein to form a series of V-shaped projecting portions, said projecting portions of each of said anvils being receivable in the slots of the anvil opposite thereto whereby opposed anvils mesh upon closure of said jaws, spaced upper and lower guide members having end portions extending between said jaws for feeding an electrical component between said jaws when said jaws are in their open position, said upper guide member extending between said jaws beyond said lower guide member, a downwardly turned surface formed on said upper guide member beyond the end of said lower guide member, air jet means positioned opposite said downwardly turned surface to force the component against said surface for suspending the component at a point spaced between said jaws, said upper jaw being arranged whereby the V-shaped anvils mounted thereon engage the leads of the electrical component and remove the electrical component from said downwardly turned surface when said upper and lower jaws move to their closed position, air jet means for ejecting the electrical component upon the opening of said jaws, and means for opening and closing said jaws.

References Cited in the file of this patent

UNITED STATES PATENTS

| | | |
|---|---|---|
| 1,109,662 | Cavanagh | Sept. 8, 1914 |
| 1,130,679 | Staunton | Mar. 2, 1915 |
| 1,311,590 | Bingham | July 29 1919 |
| 1,870,584 | Ostrom | Aug. 9, 1932 |
| 2,377,294 | Belada et al. | May 29, 1945 |
| 2,416,832 | Hulburt | Mar. 4, 1947 |
| 2,427,508 | Raspet | Sept. 16, 1947 |
| 2,433,066 | Rund | Dec. 23, 1947 |
| 2,439,548 | Planeta | Apr. 13, 1948 |
| 2,534,140 | Moore | Dec. 12, 1950 |
| 2,601,462 | Streader | June 24, 1952 |
| 2,621,824 | Gookin | Dec. 16, 1952 |
| 2,772,416 | Dorosz et al. | Dec. 4, 1956 |
| 2,822,854 | Berg | Feb. 11, 1958 |
| 2,854,054 | Gross | Sept. 30, 1958 |
| 2,854,298 | Baumeister | Sept. 30, 1958 |
| 2,869,129 | Rogers | Jan. 20, 1959 |
| 2,889,474 | Macks | June 2, 1959 |
| 2,891,597 | Peck | June 23, 1959 |
| 2,911,014 | Van Nest | Nov. 3, 1959 |
| 2,928,452 | Diggle et al. | Mar. 15, 1960 |

FOREIGN PATENTS

| | | |
|---|---|---|
| 81,339 | Switzerland | June 2, 1919 |
| 83,552 | Switzerland | May 1, 1920 |

UNITED STATES PATENT OFFICE

CERTIFICATE OF CORRECTION

Patent No. 3,028,886 April 10, 1962

Willard D. Drukker

It is hereby certified that error appears in the above numbered patent requiring correction and that the said Letters Patent should read as corrected below.

Column 4, line 23, for "causes" read -- causing --; column 5, lines 71 and 72, strike out "a pair of guide tracks each having wire leads to be straightened,".

Signed and sealed this 18th day of September 1962.

(SEAL)
Attest:

ERNEST W. SWIDER
Attesting Officer

DAVID L. LADD
Commissioner of Patents